United States Patent [19]

Nosley

[11] 3,881,350
[45] May 6, 1975

[54] ELECTROMAGNETIC SENSOR FOR MEASURING VELOCITY OF FLUIDS UNDER HIGH PRESSURE

[75] Inventor: Jacques Andre Nosley, Marseille, France

[73] Assignee: Societe Ben, Marseille, France

[22] Filed: June 15, 1972

[21] Appl. No.: 263,255

[30] Foreign Application Priority Data
June 17, 1971  France .............................. 71.23145
May 4, 1972  France .............................. 72.15848

[52] U.S. Cl. .......................... 73/194 EM; 73/170 A
[51] Int. Cl. ............................................... G01f 1/00
[58] Field of Search ......... 73/181, 170 A, 431, 273, 73/194 EM

[56] References Cited
UNITED STATES PATENTS
3,161,047  12/1964  Griswold ........................... 73/181 X
3,171,281  3/1965  Coyle et al ........................... 73/431
3,175,395  3/1965  Atanasoff ........................... 73/170 A
3,248,939  5/1966  Silverstein ........................... 73/170 A FOREIGN PATENTS OR APPLICATIONS
31,827  11/1966  Japan .................................... 73/181

*Primary Examiner*—Charles A. Ruehl
*Attorney, Agent, or Firm*—Sherman & Shalloway

[57] ABSTRACT

An electromagnetic sensor for measuring velocity of fluids under high pressure including a housing formed of a tubular piston member slidably engaging a tubular cylinder member and an electrical sensing device disposed within the cylinder member and having electrodes extending through a thin insulating wall sealing an end of the cylinder member. High pressure external of the housing of a fluid being sensed is transmitted by the piston member to the insulating wall through a chamber formed in the cylinder member filled with an incompressible insulating fluid such that the pressure differential across the insulating wall is reduced to a minimum to avoid deflection thereof.

8 Claims, 5 Drawing Figures

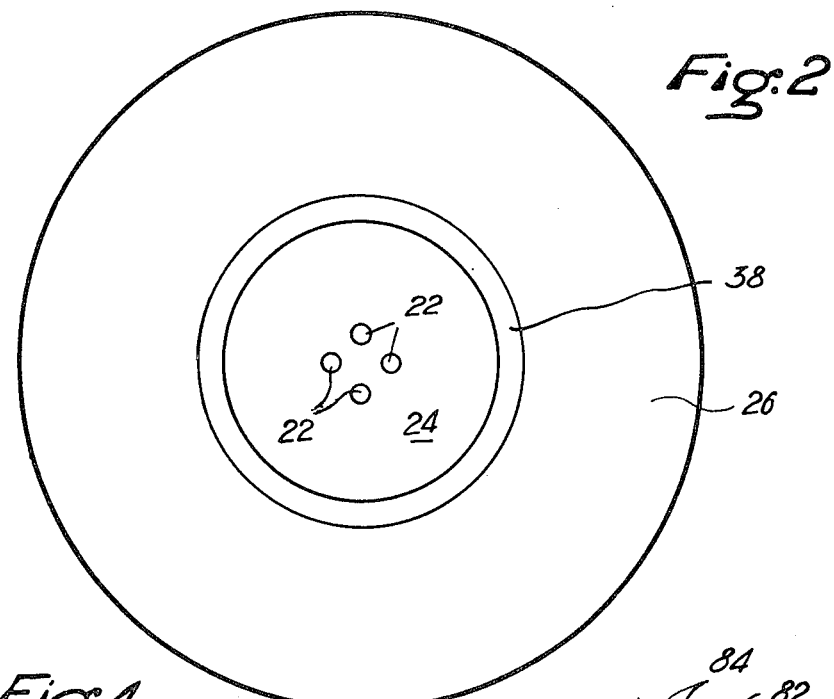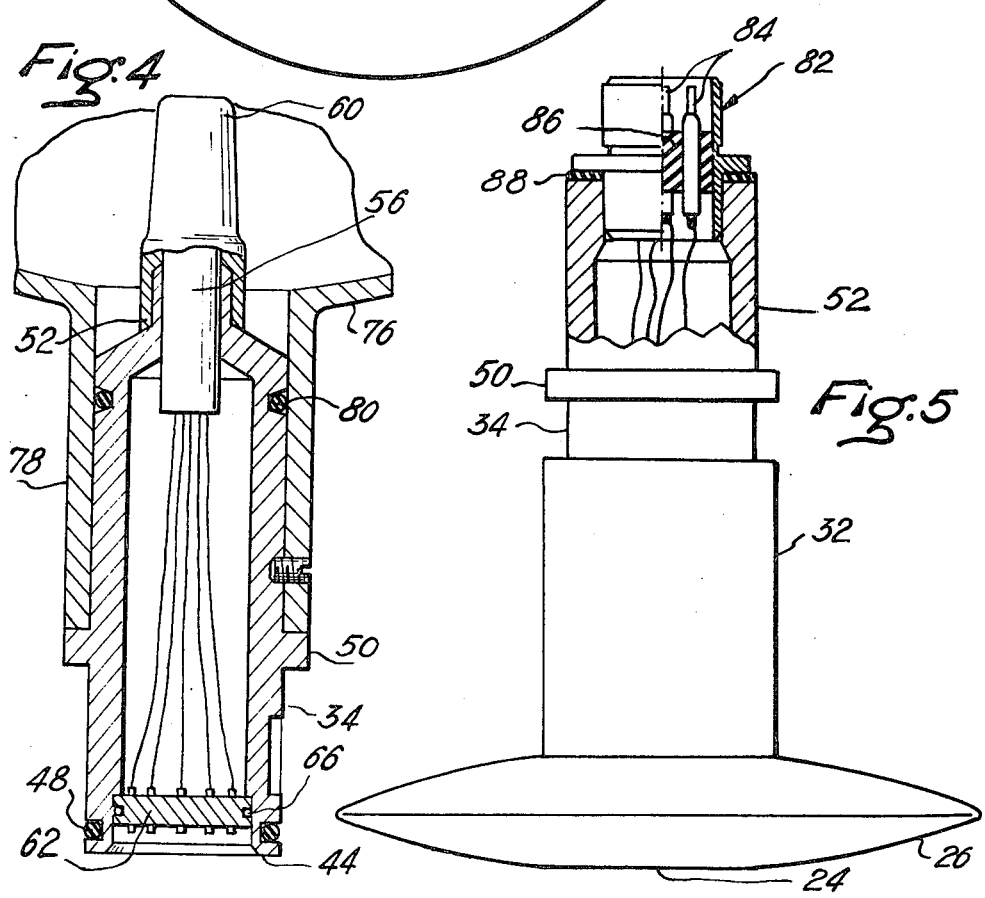

ELECTROMAGNETIC SENSOR FOR MEASURING VELOCITY OF FLUIDS UNDER HIGH PRESSURE

BACKGROUND OF THE INVENTION

1. Field of the Invention

The present invention pertains to electrical sensors and, more particularly, to electromagnetic sensors constructed to facilitate measurement of the velocity of fluids under high pressure.

2. Discussion of the Prior Art

Electromagnetic sensors and other electrically operated sensors used to measure various fluid characteristics conventionally include electrodes which must be exposed to the fluid to be sensed while remainder of the sensing structure must not be exposed to the fluid. Accordingly, the electrodes are normally provided in an insulating wall with the electrodes being sealed in the wall to prevent leakage of any fluid into the body or housing of the sensor. Such electromagnetic sensors are commonly used to measure the velocity of fluids such as sea water under high pressures, and the seal between the electrodes and the insulating wall is difficult to maintain at such high pressures in that the wall has a tendency to flex inwardly when subjected to high pressure. In order to overcome this problem, the thickness of the insulating wall must be substantially increased; however, this increased thickness is detrimental to the efficiency of the sensors. In many cases the insulating wall thickness required to withstand the pressure of the fluid is so great that no sensor can be utilized therewith. In any case, the accuracy of electromagnetic sensors is substantially reduced where the insulating wall supporting the electrodes in sealed relation thereto is required to be of substantial thickness.

In order to overcome the problem of increased insulating wall thickness, it has been suggested to maintain an internal pressure within the housing of the electromagnetic sensor substantially equal to the external pressure of the fluid to be measured, this solution normally being implemented by filling the body of the electromagnetic sensor with an insulating fluid that is substantially incompressible. With this internal pressure, the pressure differential across the insulating wall is not appreciable; and, accordingly, the insulating wall may be relatively thin. While the concept of the above mentioned solution to the problem of increased insulating wall thickness is excellent in theory, in practice, electromagnetic sensors utilizing this concept require the use of bellows, diaphragms or pistons, which additonal components are fairly bulky, difficult to precisely align for seating and substantially increase manufacturing costs.

SUMMARY OF THE INVENTION

Accordingly, it is an object of the present invention to overcome the above-mentioned problems with respect to the measurement of velocity of fluids under high pressure while permitting the use of a substantially thin insulating wall.

The present invention is generally characterized in an electrical sensor for measuring fluid velocity including a housing having first and second tubular members slidably engaged with a fluid-tight seal, an electrical sensing device disposed in the first tubular member, and electrical conductors connected with the electrical sensing device and extending axially through the first and second tubular members.

More specifically, the present invention is directed to an electromagnetic sensor for measuring the velocity of fluids under high pressure including a first tubular member having a thin insulating wall at a closed end thereof and an open end, an electromagnetic sensing device disposed adjacent the closed end of the first tubular member and having at least one pair of electrodes passing through the thin insulating wall, a second tubular member having a first end slidably engaging the open end of the first tubular member in fluid-tight relation and acting as a piston to transmit external pressure to a chamber within the first tubular member, electrical conductors connecting the electromagnetic sensing device to a source of electricity and a circuit for receiving signals from the electrodes, and an incompressible insulating material filling the chamber within the first tubular member.

A primary object of the present invention is to utilize the housing of an electromagnetic sensor to balance internal and external pressures.

A further object of the present invention is to construct the housing of an electrical sensor for measuring the velocity of fluids at high pressures of a pair of telescoped tubular members slidable within each other with a fluid-tight seal in order to balance the pressure of the fluid being measured.

The present invention has an additional object in that a housing for an electromagnetic sensor is formed of a pair of slidably engaged tubular members, an electromagnetic sensing device in one of the members and electrical conductors connected with the sensing device extending through the housing to exit from the other of the tubular members, the tubular members sliding within each other with a piston effect to balance external and internal pressures.

Another object of the present invention is to utilize a pair of tubular members slidably engaged with a fluid-tight seal to form a housing for an electromagnetic sensor, one of the tubular members having a chamber therein for receiving an electromagnetic sensing device and an incompressible insulating fluid and the other of the members having a sealed end defining a compartment therein filled with an incompressible insulating fluid or paste or air or a gas low pressure.

Some of the advantages of the present invention over the prior art are that additional components are not required for the electromagnetic sensor in order to balance high pressure of fluids being measured, and an electromagnetic sensor constructed in accordance with the present invention can utilize a thin insulating wall without substantially increasing the bulk or cost of the sensor.

Other objects and advantages of the present invention will become apparent from the following description of the preferred embodiment taken in conjunction with the accompanying drawings.

BRIEF DESCRIPTION OF THE DRAWINGS

FIG. 2 is a front plan view of the electromagnetic sensor of FIG. 1

FIG. 4 is a partial axial section of a modification of the electromagnetic sensor of FIG. 1.

FIG. 5 is a broken axial section of a further modification of the electromagnetic sensor of FIG. 1.

DESCRIPTION OF THE EMBODIMENTS

Figure 1:
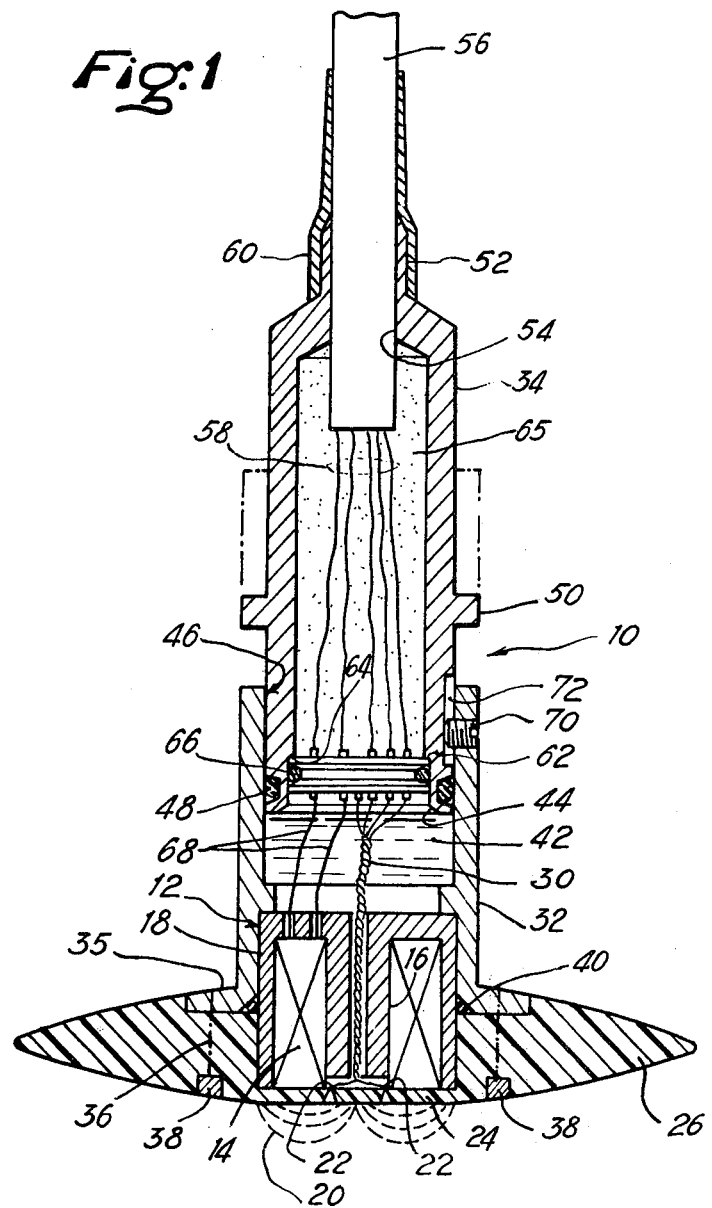
FIG. 1 is an axial section of an electromagnetic sensor constructed in accordance with the present invention.
Figure 3:
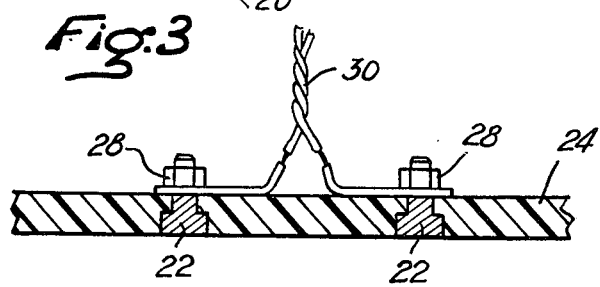
FIG. 3 is a partial section of the head of the electromagnetic sensor of FIG. 1 on a larger scale.

An electromagnetic sensor for measuring the velocity of fluids under high pressure according to the present invention is illustrated in FIG. 1 and includes a housing generally indicated at 10 and an electromagnetic sensing device generally indicated at 12 disposed within the housing. The sensing device includes an electromagnet formed of a soil 14 wrapped around a leg of a magnetic core 16 which has a yoke 18 forming pole faces to establish an electromagnetic field 20 external of the housing. As best illustrated in FIGS. 2 and 3, the electromagnetic sensing device includes two pairs of electrodes 22, the axes connecting opposite electrodes being transverse to each other. The electrodes 22 extend through a thin insulating wall 24 of a sensing head 26 in sealed relation thereto, the thin insulating wall 24 being substantially flat and integrally formed with head 26. The head 26 may be constructed of any suitable insulating material, such as Teflon, having the required dielectric properties and resistance to contamination. The head 26 has a lenticular configuration and represents a body of revolution with reference to the longitudinal axis of the electromagnetic sensor. The electrodes 22 are fastened to insulating wall 24 by nuts 28 threadedly receiving studs or bolts extending from the electrodes. Each opposed pair of electrodes is connected with a pair of twisting electrical conductors or wires 30 which pass through a bore centrally disposed within core 16.

The housing 10 includes along with head 26 a tubular cylinder member 32 and a tubular piston member 34. Cylinder member 32 carries an annular flange 35 at the bottom end thereof, and head 26 is secured to annular flange 35 by means of screws 36 which extend from a ring 38 forming a ground electrode, normally referred to as a guard ring, to define a zero potential. Cylinder member 32 is in sealed relation with head 26, which seal is effected by an O-ring 40 seated in a beveled end of cylinder member 32 adjacent flange 35. The cylindrical walls of cylinder member 32 define the sides of a chamber 42 therein with one end of the chamber 42 being further defined by thin insulating wall 24.

Piston member 34 has an end 44 which is slidably engaged with a fluid-tight seal in an open end 46 of cylinder member 32 by means of an O-ring 48 carried in an annular recess in the cylindrical wall of piston member 34 adjacent end 44. Piston member 34 has an annular collar 50 extending radially outwardly from the cylindrical wall thereof, and the upper end 52 of piston member 34 is sealed while providing a passage 54 for a sheathed cable 56 carrying a multicore cable 58. A sleeve 60 facilitates the sealing or closing of the upper end 52 of the piston member 34 by extending partially along the cable 56 and engaging a protruding nipple-like portion of the piston member.

A relatively thick and sturdy plug 62 is carried at end 44 of piston member 34 seated on an annular shoulder 64 to define a compartment 65 within the piston member. The plug carries an 0-ring 66 around the outer periphery thereof to seal the lower end 44 of the piston member, and a plurality of contacts are carried by the plug to permit interconnection between the twisted pairs of electrical conductors 30, a pair of electrical supply conductors 68 and electrical conductors 58 which exit the housing 10 by means of cable 56 through an upper end 52 of the piston member.

The collar 50 is adapted to abut a stop formed by the open end 46 of cylinder member 32 to limit the downward stroke of the piston member with the cylinder member. A set screw 70 threadedly engages the cylindrical wall of cylinder member 32 and is received within a longitudinal recess 72 in the wall of piston member 34 in order to limit the upward stroke of the piston member and also to limit rotation of the cylinder and piston members relative to each other. As will be described hereinafter, chamber 42 may be filled with an incompressible insulating fluid and a fluid-tight removable plug (not shown) may be disposed in the wall of cylinder member 32 in order to permit filling of the chamber 42.

The tubular members 32 and 34 of the housing 10 may be constructed of any suitable strong material; and, where a metal material is utilized, a metal should be selected that is not subject to attack by the ambient medium or fluid to be measured. Where the fluid to be measured is sea water, the pressure of which may be as much as 1,000 bars, stainless steel or Monel metal or titanium may be utilized.

In operation, coil 14 is energized by alternating current supplied through conductors 68 such that core 16 establishes magnetic field 20 substantially transverse to the planar surface of wall 24 of head 26. The entire electromagnetic sensor is immersed in the fluid to be sensed; and, when the fluid which is assumed to be conductive, moves transverse to the plane of FIG. 1, electromotive forces are produced in proportion to the velocity of the fluid. The electromotive forces are induced in the vicinity of the planar surface where the electromagnetic field is strongest, the lines of the force being very short and not being disturbed by electrical conditions of the environment beyond a distance of the order of magnitude of the diameter of the sensor housing.

The pairs of electrodes 22 supply a voltage signal to conductor pairs 30, which signal is supplied to suitable measuring circuitry external of the electromagnetic sensor. If the flow of fluid is parallel to the plane of FIG. 1 and transverse to the longitudinal axis of the housing 10, the induced voltage will be transverse to the plane of FIG. 1 and collected by the pair of electrodes disposed transversely with reference to the plane of FIG. 1. If the direction of flow between the two orthogonal directions, the voltages will appear on one or the other of the pairs of electrodes 22. The induced voltages are in proportion to the speed vector on the two transverse axes between opposed pairs of electrodes; and, thus, the voltages at each pair of electrodes are in proportion to the orthogonal coordinates of the velocity vector.

Since the electromagnetic sensor is a body of revolution, the velocity of the fluid near the planar surface of thin insulating wall 24 will have a direction undisturbed by the sensor and due to the profiled lenticular configuration of the head 26, the velocity of the fluid is substantially undisturbed and the correction coefficient remains constant, close to unity. The planar or flatened configuration of the lenticular head 26 channels the fluid when flow is not absolutely transverse to the plane of the FIGURE. If the fluid has a flow or flow vector having a primary direction not transverse to the longitudinal axis of the sensor, head 26 should be provided with a spherical configuration to enclose the sensor.

As the pressure of the fluid to be sensed increases, thin insulating wall 24 will have a tendency to deflect into the sensor which, as mentioned above, would undesirably modify the voltages obtained from electrodes 22 due to their displacement within the electromagnetic field 20. Furthermore, the relatively thin nature of insulating wall 24 would tend to break the seal provided thereby and present the problem of rupture of the wall 24 at positions not supported by the head. Such deflection does not ooccur with the electrical sensor of the present invention due to the piston effect provided by the sealed end 44 of piston member 34 within cylinder member 32. That is, whatever medium fills chamber 42 serves to transmit pressure from piston member 34 to the thin insulating wall 24 to minimize the pressure differential thereacross. Chamber 42 may be filled with an incompressible insulating fluid, such as a liquid of low elasticity; and, since piston member 34 is subject to the same external pressure from the sensed fluid as insulating wall 24, the piston will transmit such pressure to chamber 42 thereby providing only a relatively small pressure differential across thin insulating wall 24. The slight pressure differential results from friction of piston member 34 sliding within cylinder member 32, such friction being localized particularly at the seal provided by 0-ring 48.

By "fluid" it is intended to means any material which may show a fluid deformation at the operative pressure even if this material does not behave like a solid material at the atmospheric pressure. On the other hand the term "incompressible" as used herein to described the fluid to fill the chamber 42 and the compartment 65 incompasses those materials being substantially resistant to compression, and the imcompressibility of the material within the compartment 65 provides the functions of maintaining the pressure within the compartment 65 since cable 56 is elastic and cannot be sufficiently tightened by sleeve 60 thereby permitting external pressure to drive the cable 56 into the compartment 18 and holding the cable 18 in place, which cable is subject to traction stress during manipulation of the sensor.

Plug 62 and 0-ring 66 prevent the pressure in compartment 65 from balancing with the pressure in chamber 42, which pressure in transitory decompression is higher than the external pressure. By isolating the pressures between chamber 42 and compartment 65, sleeve 60 is prevented from being forced off of the piston member 34 and the insulating liquid within chamber 42 is prevented from infiltration into the cable 56. If such inflitration were to occur, collar 50 would abut the stops at the end of cylinder member 32 to prevent piston-like interaction between the tubular members to balance pressure.

If the electromagnetic sensor is utilized under conditions where there is reason to be apprehensive about sleeve 60 and infiltration of insulating liquid into the cable, a permanent seal may be formed across lower end 44 of piston member 32 as a substitute for plug 62 and 0-ring 66. The electrical conductors are preferably twisted to avoid induction and are preferably armored or shielded so as not to be subjected to adverse effects from the environment of the sensor and stray fields.

A modification of the electromagnetic sensor of FIG. 1 is illustrated in FIG. 4 with identical parts being given identical reference numbers and not described again.

The modification of FIG. 4 is for use with an enclosure 76 which can be maintained at a low pressure. The enclosure 76 defines an internal chamber maintained at a low pressure and has a cylindrical neck 78 extending from enclosure 76 having an inner diameter substantially equal to the outer diameter of piston member 34 such that the piston member may be received therein. Adjacent the upper end of piston member 34, an 0-ring 80 is received in an annular recess in order to provide a fluid-tight seal with neck 78. With the modification of FIG. 4 the compartment 65 in piston member 34 may be merely filled with air or gas under low pressure since the compartment above the plug 62 is not subject to great pressure due to the low pressure maintained within the chamber of enclosure 76.

A further modification of the electromagnetic sensor of FIG. 1 is illustrated in FIG. 5 and identical parts are given identical reference numbers and not described again. The primary difference between the embodiments of FIGS. 1 and 5 is that in the modification of FIG. 5 the upper end 52 of piston member 34 carries a high pressure take-off base 82 such as those manufactured by Souriau in France and Marsh Marine in the United States. Such high pressure take-off bases are designed to operate under high pressure, some being connectable under water. The electrical connections are provided by pins 84 which extend through a rubber block 86, the compression of the rubber block resulting from external ambient pressure of the fluid sealing the rubber block to the pins to prevent fluid leakage therearound. The fluid-tight seal provided by take-off base 82 on piston member 34 is ensured by the use of a washer 88 receiving a flange extending around the take-off base.

While the present invention has been described above with respect to electromagnetic sensors, the present invention may be utilized with various types of electrical sensors; and, similarly, while the housing 10 of the sensor of the present invention preferably takes the form of a pair of tubular members slidably engaged with a fluid-tight seal, such members may have various configurations, it being of primary concern only that they have a hollow configuration to permit the piston-cylinder relationship between the members to provide pressure balancing. That is, in accordance with the present invention the housing is basically constructed of first and second slidably engaged or telescoped hollow members whereby the first hollow member may contain a thin insulating wall at one end thereof, and the second hollow member acts as a piston in order to transmit the external pressure of the fluid being sensed to the first hollow member. The seal provided at end 44 of piston member 34 is not neccessary in order to provide piston-like pressure balancing in that the seal at end 52 may be sufficient to permit piston member 34 to act as a piston without the use of sealed plug 62. It is noted, however, as described above, that the use of plug 62 overcomes problems associated with the sealing of the cable 56 and stress on the electrical conductors and also infiltration of fluid into the cable.

The materials to be filled in chamber 42 and compartment 65 depend upon the application for which the electrical sensor is to be used; and, accordingly, where the entire housing is subjected to high pressure, it is preferable to fill chamber 42 with an incompressible insulating fluid and compartment 65 with an incompressible insulating solid material such as a paste.

Where a low pressure enclosure is utilized, such as in the embodiment of FIG. 4, compartment 65 may be merely filled with air or gas under low pressure.

Inasmuch as the present invention is subject to many variations, modifications and changes in detail, it is intended that alal matter described above or shown in the accompanying drawings be interpreted as illustrative and not in a limiting sense.

What is claimed is:

1. An electromagnetic sensor for measuring velocity of fluids under high pressure comprising first hollow means having a closed end and an open end; electromagnetic means disposed in said first hollow means adjacent said closed end and adapted to establish a magnetic field through a portion of a fluid to be measured; electrode means disposed in said closed end of said first hollow means to serve variations in the magnetic field; electrical conductor means connected with said electromagnetic means and said electrode means; and second hollow means having a first end slidably engaging said open end of said first hollow means with a fluid-tight seal and a second end, said electrical conductor means extending through said first and second hollow means and exiting said electromagnetic sensor through said second end of said second hollow means, said first and second hollow means sliding relative to each other with a piston effect to balance the internal pressure within said first and second hollow means with the pressure of the fluid external of said first and second hollow means.

2. The electromagnetic sensor as recited in claim 1 wherein said first hollow means includes a tubular cylinder member and said second hollow means includes a tubular piston member slidable within said cylinder member.

3. The electromagnetic sensor as recited in claim 2 wherein said cylinder member has a chamber defined therein and said piston member has a sealed end extending within said cylinder member to define a wall of said chamber.

4. The electromagnetic sensor as recited in claim 3 wherein said chamber is filled with an incompressible insulating fluid.

5. The electromagnetic sensor as recited in claim 4 wherein said closed end of said cylinder member is a thin insulating wall and said electrode means includes at least one pair of electrodes extending through said thin insulating wall in sealed relation thereto.

6. The electromagnetic sensor as recited in claim 5 wherein said sealed end of said piston member includes a plug sealably engaging the inner surface of said piston member, said plug providing electrical connections for said electrical conductor means.

7. The electromagnetic sensor as recited in claim 6 wherein said second end of said piston member is sealed by a high pressure base.

8. The electromagnetic sensor as recited in claim 7 wherein said piston member has a compartment formed therein defined at one end by said plug, said compartment in said piston member being filled with an incompressible solid insulating material.

* * * * *